United States Patent
Seymour, II

(10) Patent No.: US 6,637,781 B1
(45) Date of Patent: Oct. 28, 2003

(54) COUPLING

(75) Inventor: Kenneth R. Seymour, II, Villa Park, IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 10/265,799

(22) Filed: Oct. 7, 2002

(51) Int. Cl.[7] .................................................. F16L 27/00
(52) U.S. Cl. ........................ 285/305; 285/81; 285/91; 285/307; 285/23
(58) Field of Search ...................... 285/305, 39, 321, 285/81, 82, 91, 307, 23

(56) References Cited

U.S. PATENT DOCUMENTS

| | | | | |
|---|---|---|---|---|
| 3,177,018 A | * | 4/1965 | Goodwin ..................... | 285/277 |
| 3,773,360 A | * | 11/1973 | Timbers ...................... | 285/307 |
| 4,240,654 A | * | 12/1980 | Gladieux ..................... | 285/276 |
| 4,872,710 A | * | 10/1989 | Konecny et al. ............... | 285/81 |
| 5,437,483 A | * | 8/1995 | Umezawa ..................... | 285/308 |
| 5,553,895 A | * | 9/1996 | Karl et al. .................... | 285/39 |
| 5,727,821 A | * | 3/1998 | Miller ......................... | 285/318 |
| 5,782,502 A | * | 7/1998 | Lewis ......................... | 285/87 |
| 5,934,709 A | * | 8/1999 | Morrison ..................... | 285/39 |
| 5,951,063 A | * | 9/1999 | Szabo ........................ | 285/303 |
| 6,065,779 A | | 5/2000 | Moner et al. | |
| 6,145,887 A | * | 11/2000 | Cambot-Courrau ............ | 285/4 |
| 6,183,020 B1 | * | 2/2001 | Luft ............................ | 285/93 |
| 6,305,721 B1 | * | 10/2001 | Heinrichs et al. ............. | 285/23 |

* cited by examiner

Primary Examiner—Eric K. Nicholson
(74) Attorney, Agent, or Firm—Dennis Kelly Sullivan; Susan L. Lukasik; Jeffrey P. Calfa

(57) ABSTRACT

A coupling assembly for coupling fluid components includes a female coupler having a receiver defined therein. A male coupler has an insert, the insert being receivable within the female coupler receiver in sealing engagement. And, a spacer is matable to both the female coupler and the male coupler when the female coupler and the male coupler are in sealing engagement, the spacer effecting positive engagement of the female and the male couplers. A method of coupling/uncoupling a coupling assembly is also included.

27 Claims, 7 Drawing Sheets

COUPLING

TECHNICAL FIELD

The present invention is related to couplings for coupling components of a fluid flow system. More particularly, the present invention is related to a coupling that is readily engageable and disengageable and is capable of conveying a fluid at relatively high pressure.

BACKGROUND OF THE INVENTION

There is a need in industry for a coupler for coupling tubular elements, primarily hoses. The coupler must provide for positive engagement of the mating coupler components and be engageable and disengagement without the use of wrenches or other tools.

SUMMARY OF THE INVENTION

The present invention substantially meets the aforementioned needs of the industry. A male coupler is insertable into a female coupler and retained in position by an expandable snap ring. A spacer provides for positive engagement between the male coupler and the female coupler. This engagement of the male coupler from the female coupler is effected by removing the spacer and plunging the male coupler further into the female coupler to disengage the snap ring then simply withdrawing the male coupler from the female coupler. The engagement and disengagement noted above is all effected manually without the use of tools.

The present invention is a coupling assembly for coupling fluid components and includes a female coupler having a receiver defined therein. A male coupler has an insert, the insert being receivable within the female coupler receiver in sealing engagement. And, a spacer is matable to both the female coupler and the male coupler when the female coupler and the male coupler are in sealing engagement, the spacer effecting positive engagement of the female and the male couplers. The present invention is further a method of coupling/uncoupling a coupling assembly.

DETAILED DESCRIPTION OF THE DRAWINGS

The coupling assembly of the present invention is shown generally at 10 in the figures. The coupling assembly 10 has three major components: male coupler 12, female coupler 14, and spacer 16. It should be noted that the spacer 16 could be shiftably disposed in a housing made integral with either the male coupler 12 or the female coupler 14. In such a housing, the spacer 16 could be biased in an engaged disposition and force applied to the spacer 16, such as by the thumb of a user, would act against the bias to disengage the spacer as depicted in FIGS. 4–7.

Figure 1:
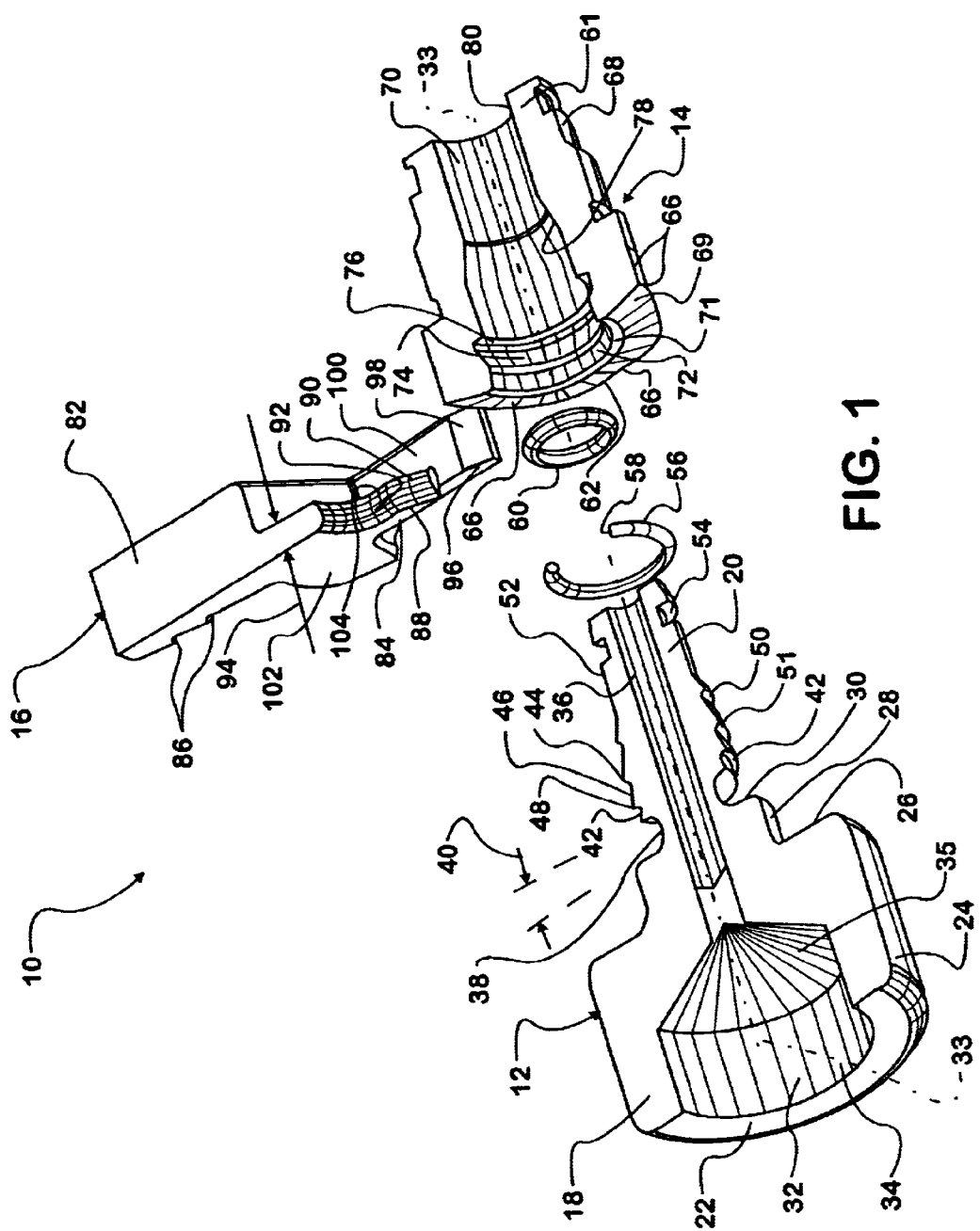
FIG. 1 is a perspective, exploded, sectional view of the coupling assembly of the present invention.

Referring to FIG. 1, the male coupler 12 of the coupling assembly 10 includes a knob 18 and an insert 20. Preferably, the male coupler 12 is formed as a unitary, integral component and may be formed of a plastic or metallic material. It is understood that the knob 18 may be omitted from the male coupler 12.

The knob 18 of the male coupler 12 has a top margin 22 that is generally ring shaped, having both an inside diameter and an outside diameter. The knob 18 has a top margin 22 coupled to circumferential side margin 24. A bottom margin 26 is in an opposed disposition with respect to the top margin 22.

A neck 28 depends from the bottom margin 26. The neck 28 has a diameter that is substantially less than the diameter of the circumferential side margin 24. The bottom margin of the neck 28 defines a bearing surface 30.

An axial bore 32 is defined through the male coupler 12 concentric with longitudinal axis 33. The axial bore 32 is open on both ends to accommodate the passage of fluid through the male coupler 12. The axial bore 32 has an expanded portion 34 that is reduced in diameter by a bevelled portion 35 to a reduced portion 36 that has a significantly reduced diameter as compared to the expanded portion 34. The expanded portion 34 is defined in the knob 18 and the reduced portion 36 is largely defined within the insert 20.

The insert 20 of the male coupler 12 includes an outer margin, the other margin defining a spacer groove 38. The spacer groove 38 has a significantly reduced diameter and has a spacer groove width 40 defined on one side by the bearing surface 30.

An L-shaped relief 42 is formed adjacent to the spacer groove 38. The relief 42 has a diameter that is greater than the diameter of the spacer groove 38.

A first ridge 44 and a second ridge 48 are disposed adjacent to one another and define a valley 46 therebetween. The ridges rise gradually to peak and then fall off after the peak is crested. The second ridge 48 is defined in part by a radial wall that forms a portion of the relief 42. The ridges 44, 48 have a greater diameter than the relief 42.

Proceeding toward the distal end of the insert 20, a ring retainer 50 is defined by a minor ridge spaced apart from the first ridge 44. A shallow valley 51 is defined between the ring retainer 50 and the first ridge 44.

A shank 52 is disposed proximate the distal end of the insert 20. The shank 52 preferably has a substantially cylindrical outer margin. A seal groove 54 is defined in the shank 52 proximate the distal end of the insert 20.

The male coupler 12 further includes an expandable snap ring 56 that has a split 58 defined therein. The snap ring 56 is preferably formed of a resilient, expandable metallic material.

A seal 60 is disposable in the seal groove 54. The seal 60 is preferably an O-ring formed of an elastomeric material.

The second component of the coupler assembly 10 is the female coupler 14. The female coupler 14 is preferably a unitary construction and may be formed of plastic or metallic material. The female coupler 14 has a body 61. The body 61 includes a knob 62 that has a hexagonal margin. The hexagonal margin has a plurality (six) of adjacent flats 66.

The body 61 includes a shank 68 depending from the knob 62. Generally, the shank 68 has a lesser diametric dimension disposed transverse to the axis of the female coupler 14 than the diametric dimension of the knob 62 that is disposed transverse to the axis 33 of the female coupler 14. An axial bore 70 is formed concentric with longitudinal axis 33. The axial bore 70 is open at both ends to facilitate the passage of fluid therethrough. Proceeding from the proximal end. 71 of the axial bore 70, a ring receiver 72 is first defined. The ring receiver 72 may be tapered slightly inward from the proximal end 71.

An outward directed taper 74 is disposed adjacent to the ring receiver 72. The taper 74 terminates in a defined ledge 76 that is transverse with respect to the longitudinal axis 33 of the female coupler 14. The ledge 76 is radially disposed with respect to the longitudinal axis 33 of the female coupler 14. When the female coupler 14 and male coupler 12 are in the engaged, mated disposition, the taper 74 and ledge 76 cooperate with the first ridge 44, the valley 46, and the second ridge 48 to define an annular ring groove. A tapering bore 78 is disposed adjacent to the ledge 76. The diameter of the tapering bore 78 is slightly greater than the diameter of the ridges 44, 48 such that the ridges 44, 48 may be received within the tapering bore 78.

A straight bore 80 is disposed adjacent to the tapering bore 78. The straight bore 80 has a diameter that is slightly greater than the diameter of the shank 52 of the male coupler 12 so that the shank 52 may be received within the straight bore 80.

The third component of the coupling assembly 10 is the spacer 16. As noted above, spacer 16 may be disposed in a housing formed integral with either the male coupler 12 or the female coupler 14. It is important to note that the spacer 16 is depicted in section and has a mirror image upper portion such that the spacer 16 generally has the appearance when viewed from the side of a two prong fork having spaced apart fingers. Accordingly, the spacer 16 has a grip 82 and a prong portion 84. The grip 84 has a plurality of knurls 86 defined on the exterior margin to facilitate gripping the grip 82.

The prong portion 84 includes two sets of fingers disposed adjacent to one another. The first set of fingers is the spacer fingers 88. The spacer fingers 88 have a generally curved inner margin. An outwardly directed ramp 90 narrows and leads to a semi-circular spacer receiver 92. The spacer receiver 92 has a spacer width 94 as noted in FIG. 1. The spacer width is preferably less than the spacer groove width 40.

A second set of fingers of the prong portion 84 is the hex fingers 96 disposed adjacent to the spacer fingers 88. The hex fingers 96 include a ramp 98 leading to the flats 100. The flats 100 that are designed to conform to the flats 66 of the hexagonal margin of the knob 62.

Figure 2:
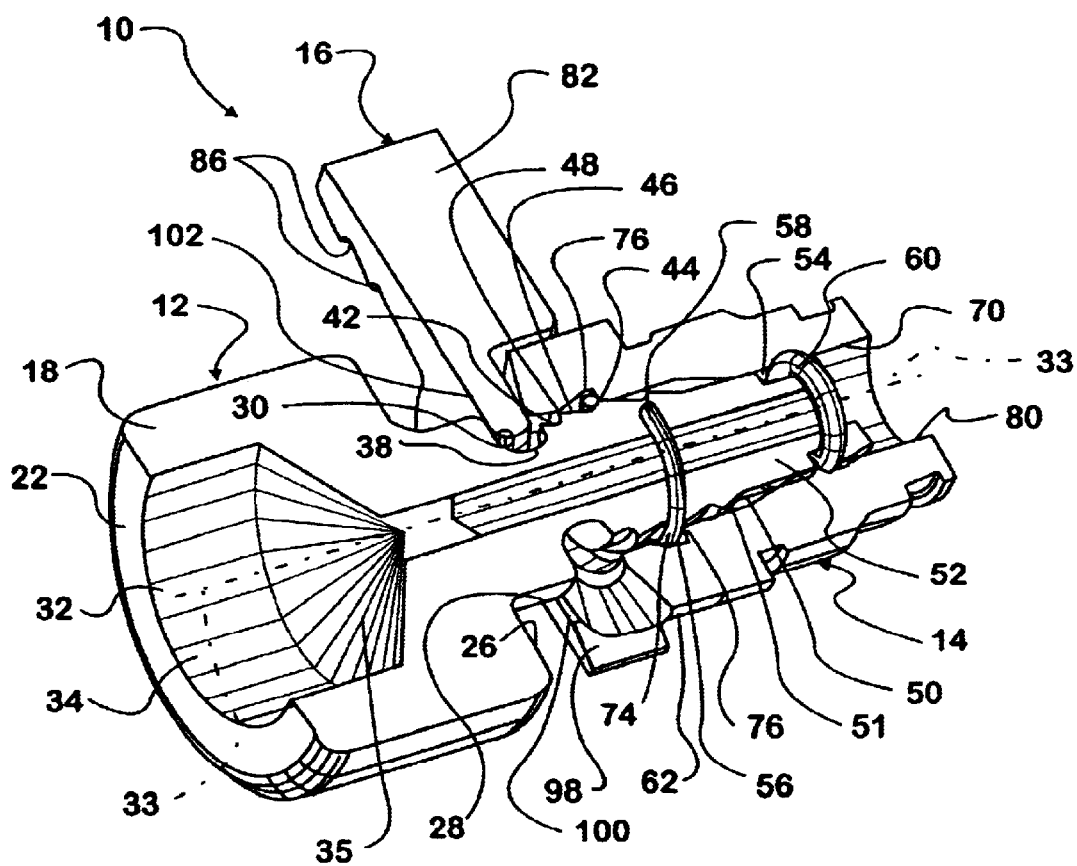
FIG. 2 is a perspective, sectional view of the coupling assembly in the engaged disposition prior to application of pressure in the fluid components.

Engagement of the male coupler 12 with the female coupler 14 is as depicted in FIG. 2. Such engagement is effected prior to charging the bores 32, 70 with fluid under pressure. Prior to engagement, the snap ring 56 is slid over the shank 52 and expanded slightly to ride over the ring retainer 50. The snap ring 56 then contracts slightly and is retained in valley 51. The seal 60 is disposed in the seal groove 54.

In the aforementioned configuration, the male coupler 12 may be inserted into the female coupler 14. In doing so, the snap ring 56 initially comes into engagement with the ledge 76 of the female coupler 14. Further insertion of the male coupler 12 into the female coupler 14 causes the snap ring 56 to ride up and over the first ridge 44 and reside in the valley 46 defined between the first ridge 44 and the second ridge 48. The seal 60 is in compressed, sealing engagement with the groove 54 and the bore 70.

At this point of insertion, the spacer 16 is shifted transversely relative to the longitudinal axis 33 of the male coupler 12 and the female coupler 14. Such shifting may be effected by a biasing spring (not shown). The ramps 98 of the opposed hexagonal FIGS. 96 engage opposed flats defined on the knob 62 of the female coupler 14. Further transverse motion of the spacer 16 causes the ramps 98 to ride on the flat 66 and thereby slightly spread the hexagonal fingers 96. The hexagonal fingers 96 then compressively engage respective flats 66 of the hexagonal margin.

Simultaneously, the opposed ramps 90 of the spacer fingers 88 engage the spacer groove 38, thereby slightly spreading the spacer fingers 88. Continued transverse movement of the spacer 16 results in the spacer groove 38 riding up the ramps 90 and being compressively engaged within the semi-circular spacer receiver 92 as the spacer receiver 92 closes to grip the spacer groove 38. In this disposition, the spacer 16 is held in engagement with the male coupler 12.

As depicted in FIG. 2, a first side margin 102 of the spacer fingers 88 is in contact with the bearing surface 30 of the male coupler 12.

Figure 3:
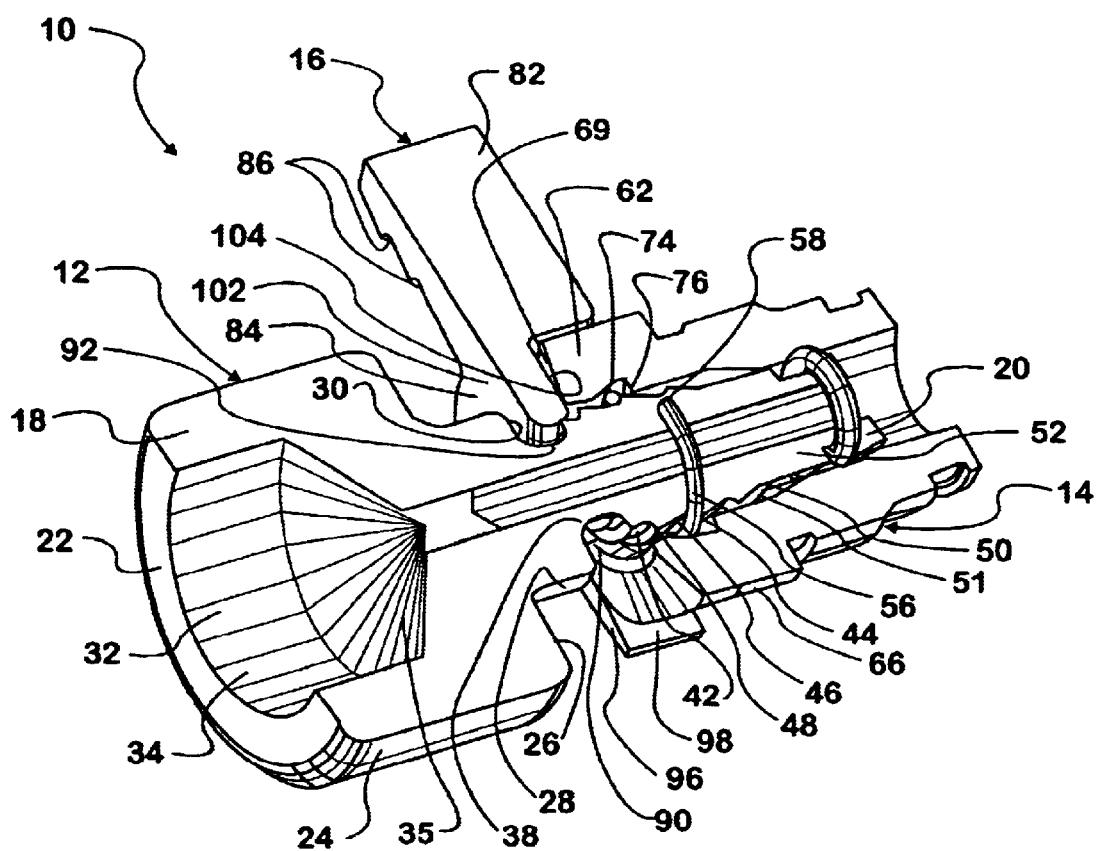
FIG. 3 is a perspective, sectional view of the coupling assembly of FIG. 2 after application of the pressure.
Figure 4:
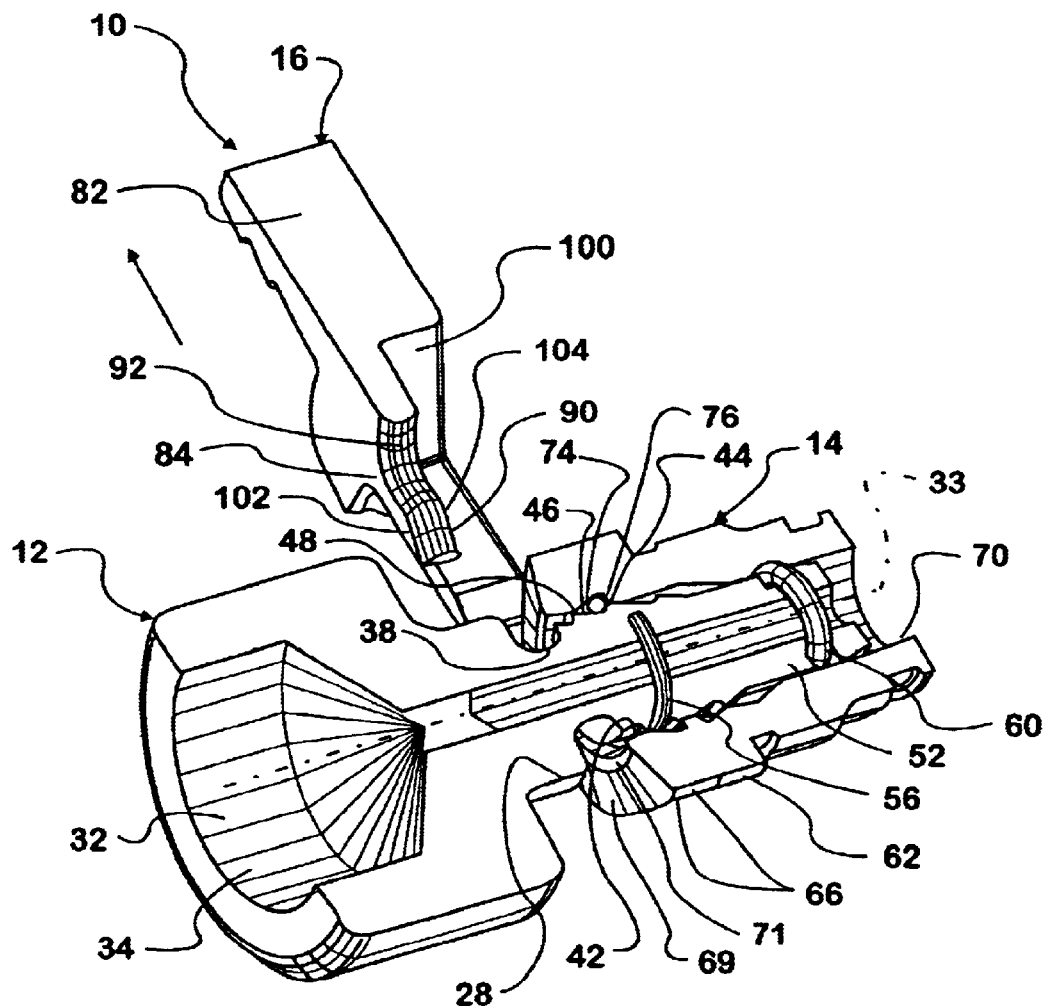
FIGS. 4–7 are perspective, sectional views of the coupling assembly depicting the sequential steps of disengaging the male coupler from the female coupler.

Referring to FIG. 3, charging the bores 32, 70 with fluid under pressure causes the male coupler 12 to shift slightly leftward with respect to the female coupler 14 as compared to the dispositions of FIG. 2. Such shifting causes the first side margin 102 to disengage from the bearing surface 30 and the second, opposed, side margin (bearing surface) 104 of the spacer fingers 88 to bear on the proximal margin 69 of the female coupler 14. It should be noted that the snap ring 56 is still captured in the annular ring groove defined in part between the first ridge 44 and the taper 74 and still resides within the valley 46, thereby locking the male coupler 12 and female coupler 14 in locked engagement.

The sequence of disengagement of the male coupler 12 from the female coupler 14 is depicted in FIGS. 4–7. Initially, hydraulic pressure is removed from the coupling assembly 10. The spacer 16 is then manually pulled away from and disengaged from the locked engaged male coupler 12 and female coupler 14, as indicated by the arrow. This could also be effected by exerting a force on the distal end of the ramp 98 in the direction of the arrow of FIG. 4. Such force must be maintained if the spacer 16 is biased in the engaged disposition. The male coupler 12 and female coupler 14 are still held in locked engagement by the ring 56 after disengagement of the spacer 16.

Figure 5:
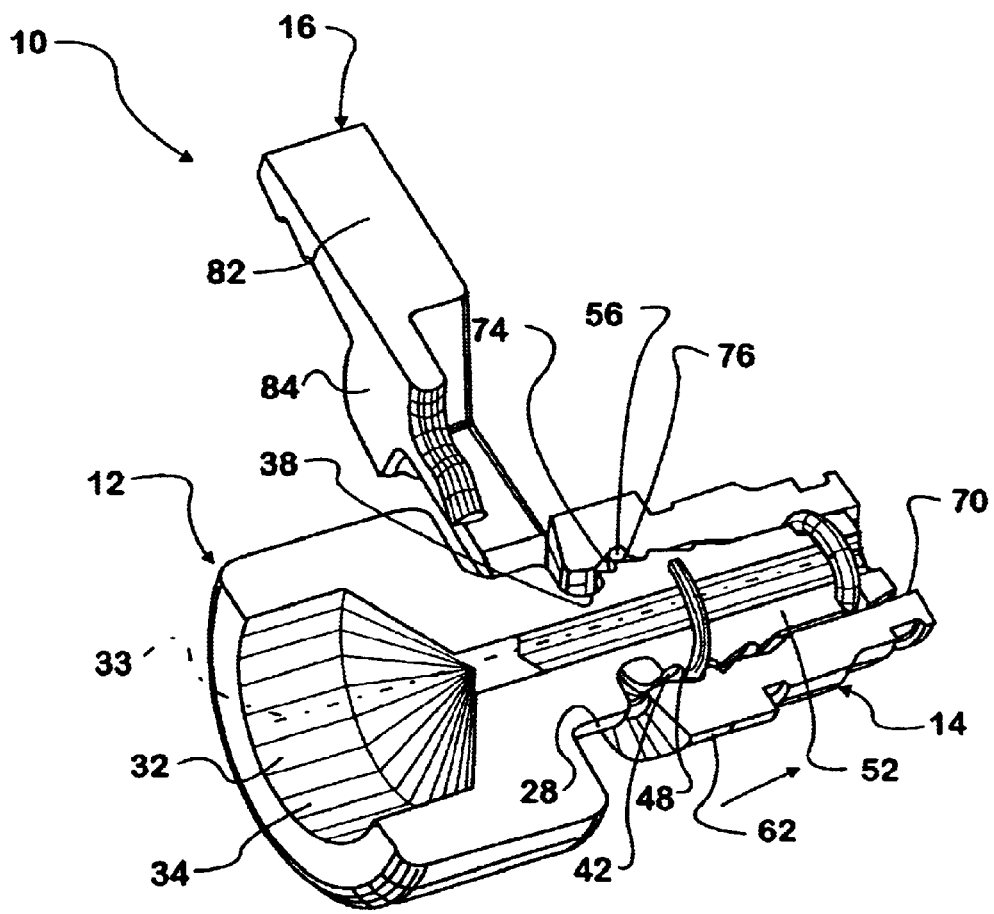

Referring to FIG. 5, the male coupler 12 is then manually plunged further into the female coupler 14, as indicated by the arrow. Such action brings the snap ring 56 into engagement with the ledge 76. As the male coupler 12 moves further into the female coupler 14, the snap ring 56 is restrained by the ledge 76. The snap ring 56 is expanded by riding up the incline of the valley 46 approaching the second ridge 48. Ultimately, the snap ring 56 rides over the crest of the second ridge 48.

Figure 6:
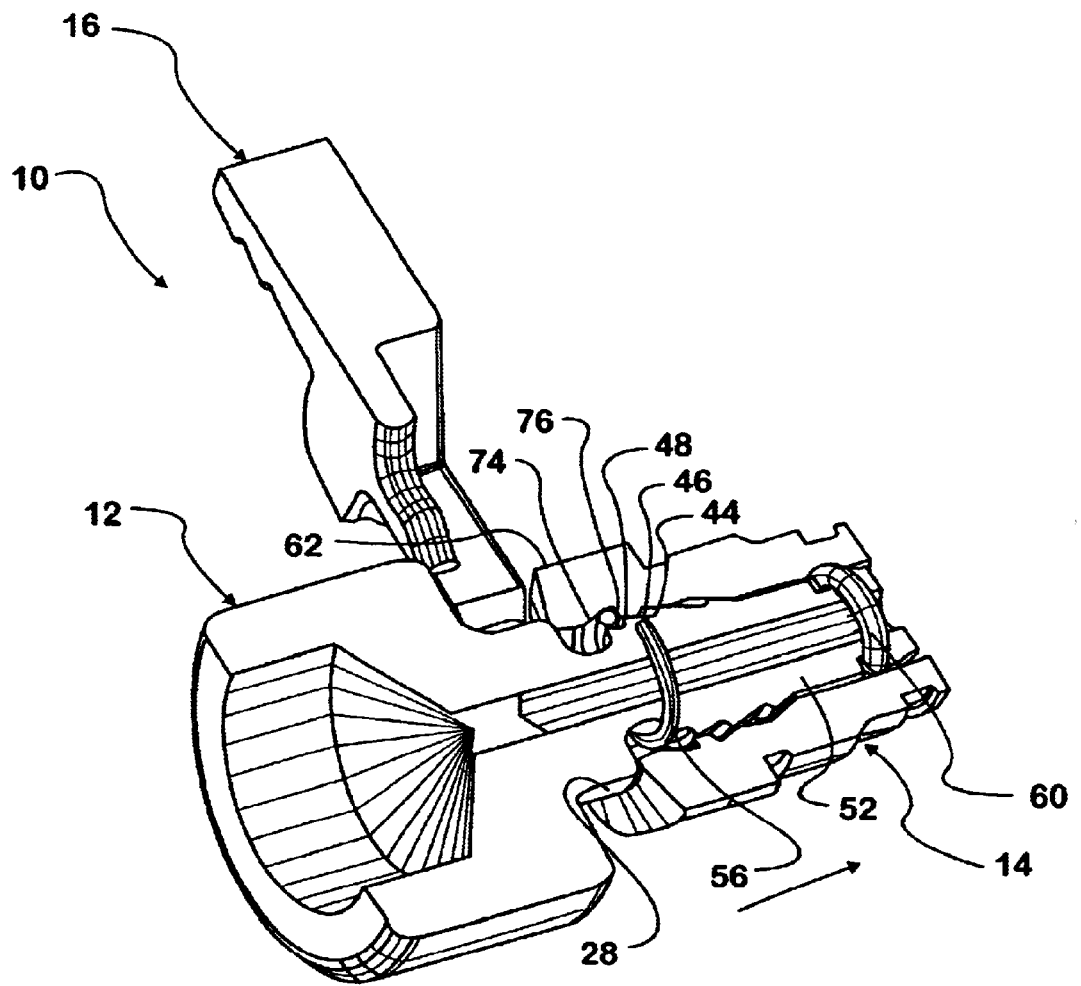
Figure 7:
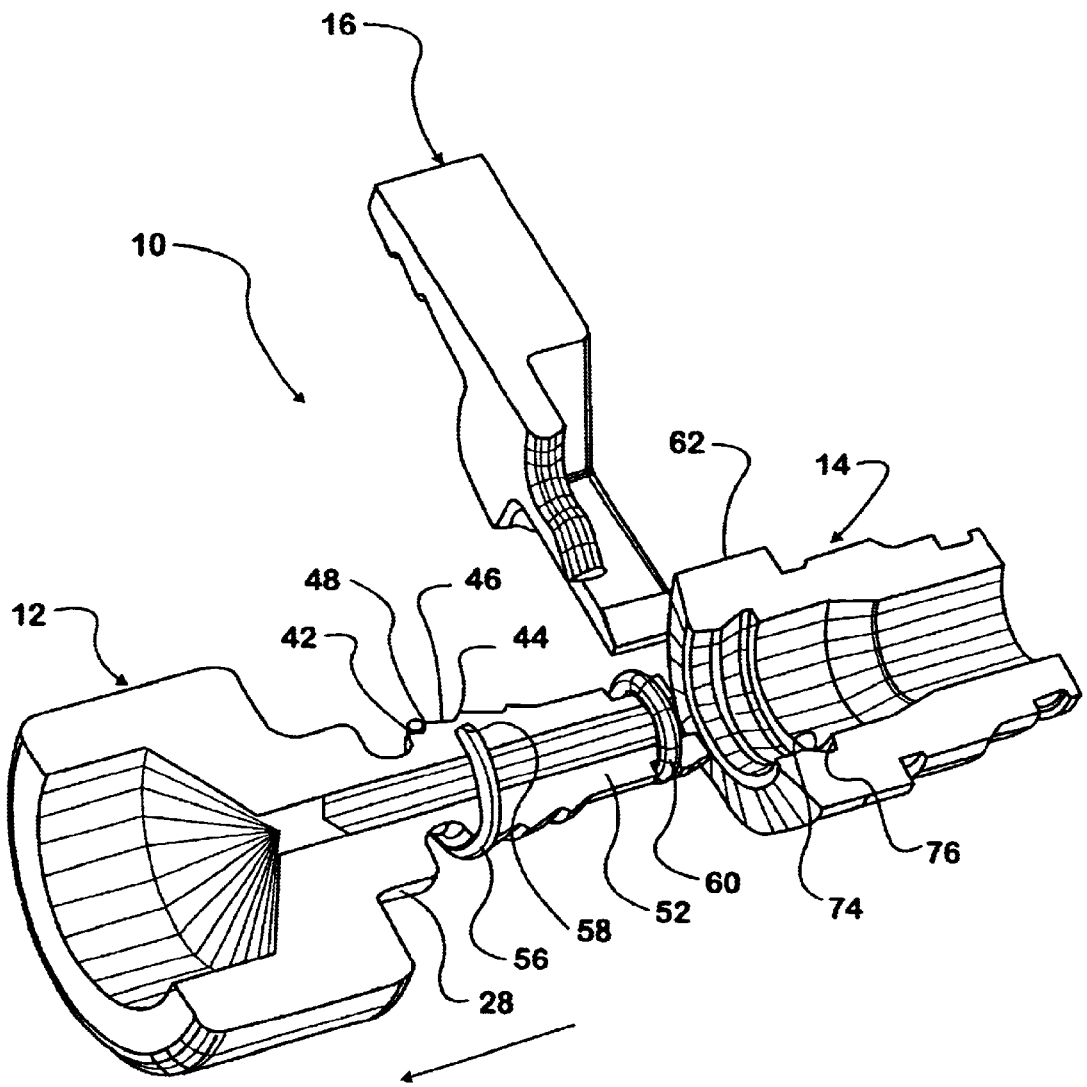

Referring to FIG. 6, the motion indicated by the arrow causes the snap ring 56 to crest the second ridge 48. Once clear of the second ridge 48, the snap ring contracts into the relief 42. In such disposition, the snap ring 56 no longer locks the male coupler 12 in engagement with the female coupler 14 and the male coupler 12 may be manually withdrawn from the female coupler 14, as depicted by the opposing arrow in FIG. 7. It should be noted that the snap ring 56 stays with the male coupler 12 in the relief 42. The snap ring 56 may then be manually opened (diametrically expanded) and slid back over the ridges 44, 48 to reside in the valley 51 adjacent to the ring retainer 50. In such disposition the coupling assembly 10 is again ready for recoupling by inserting the male coupler 12 into the female coupler 14 as described above.

It will be obvious to those skilled in the art that other embodiments in addition to the ones described herein are indicated to be within the scope and breadth of the present application. Accordingly, the applicant intends to be limited only by the claims appended hereto.

What is claimed is:

1. A coupling assembly comprising:
   a female coupler having a receiver defined therein;
   a male coupler having an insert, the insert being receivable within the female coupler receiver in sealing engagement; and
   a spacer, matable to both the female coupler and the male coupler when the female coupler and the male coupler are in sealing engagement, the spacer effecting at least in part positive, locking engagement of the female and the male couplers, the spacer having a first set of fingers being spreadable to positively engage a groove defined in an outer margin of the insert, and the first set of fingers having a width dimension, the fingers width dimension being less than a width dimension of the groove for accommodating a certain amount of axial play between the female coupler and the male coupler.

2. The coupling assembly of claim 1, the spacer having a first set of fingers and a second set of fingers, the first set of fingers for compressively engaging the male coupler and the second set of fingers for compressively engaging the female coupler.

3. The coupling assembly of claim 1, the spacer presenting a bearing surface, the first set of fingers for compressively engaging the male coupler, the female coupler bearing on the bearing surface when under fluid pressure conditions.

4. The coupling assembly of claim 1, an annular groove being cooperatively defined between a portion of the receiver and a portion of the insert, a snap ring being disposable in the annular groove.

5. The coupling assembly of claim 4, the portion of the receiver defining in part the annular groove being a taper, the taper terminating in a ledge.

6. The coupling assembly of claim 4, the portion of the insert defining in part the annular groove being a first ridge and a second ridge, the first and second ridges being spaced apart across the span of a valley.

7. The coupling assembly of claim 6, initial insertion of the insert into the receiver acting to expand the snap ring, forcing the snap ring over the peak of the first ridge.

8. The coupling assembly of claim 7, further insertion of the insert into the receiver acting to expand the snap ring, forcing the snap ring over the peak of the second ridge, the snap ring contracting to reside in a relief defined in the insert adjacent to the second ridge.

9. The coupling assembly of claim 4, the snap ring acting to lockingly engage the female coupler and the male coupler when disposed in the annular groove.

10. The coupling assembly of claim 4, the snap ring acting to unlock the female coupler and the male coupler when disposed in a relief defined in the insert adjacent to the annular groove.

11. The coupling assembly of claim 10, the snap ring being shiftable from the disposition in the annular groove to the disposition in the relief by further plunging the insert into the receiver.

12. The coupling assembly of claim 1, further plunging the insert into the receiver being restrained by engaging the spacer with the engaged female and male couplers.

13. A coupling assembly comprising:
   a female coupler having a receiver defined therein;
   a male coupler having an insert, the insert being receivable within the female coupler receiver in sealing engagement;
   snap ring being forcible into a disposition in an annular groove defined cooperatively between the receiver and the insert by inserting the insert into the receiver, the snap ring at least in part lockingly engaging the female coupler and the male coupler in such disposition; and
   a spacer, operably couplable to both the female coupler and the male coupler when the female coupler and the male coupler are in locking engagement, the spacer effecting a restraint on further insertion of the insert into the receiver, such further insertion acting to force the snap ring out of the annular groove, thereby unlocking the female and male couplers, and wherein the spacer has a first set of fingers and a second set of fingers, the first set of fingers for compressively engaging the male coupler and the second set of fingers for compressively engaging the female coupler.

14. The coupling assembly of claim 13, the spacer having a first set of fingers and presenting a bearing surface, the first set of fingers for compressively engaging the male coupler, the female coupler bearing on the bearing surface when under fluid pressure conditions.

15. The coupling assembly of claim 14, the first set of fingers being spreadable to positively engage a groove defined in an outer margin of the insert.

16. The coupling assembly of claim 15, the first set of fingers having a width dimension, the fingers width dimension being less than a width dimension of the groove for accommodating a certain amount of axial play between the female coupler and the male coupler.

17. The coupling assembly of claim 13, a portion of the receiver defining in part the annular groove being a taper, the taper terminating in a ledge.

18. The coupling assembly of claim 13, a portion of the insert defining in part the annular groove being a first ridge and a second ridge, the first and second ridges being spaced apart across the span of a valley.

19. The coupling assembly of claim 18, initial insertion of the insert into the receiver acting to expand the snap ring, forcing the snap ring over the peak of the first ridge.

20. The coupling assembly of claim 19, further insertion of the insert into the receiver acting to expand the snap ring, forcing the snap ring over the peak of the second ridge, the snap ring contracting to reside in a relief defined in the insert adjacent to the second ridge.

21. The coupling assembly of claim 13, the snap ring acting to unlock the female coupler and the male coupler when disposed in a relief defined in the insert adjacent to the annular groove.

22. The coupling assembly of claim 21, the snap ring being shiftable from the disposition in the annular groove to the disposition in the relief by further plunging the insert into the receiver.

23. In a coupling assembly, a method of coupling/uncoupling a female coupler and a male coupler comprising:
   initially inserting a male coupler insert into a female receiver;
   forcing a snap ring into an annular groove cooperatively defined by the insert and the receiver to lockingly engage the female coupler and the male coupler by the initial insertion;
   forcing the snap ring out of the annular groove cooperatively defined by the insert and the receiver to unlock the female coupler and the male coupler by further plunging insertion of the insert into the receiver; and
   selectively restraining further plunging insertion of the insert into the receiver by interposingly engaging a readily disengagable spacer between the female coupler and the male coupler expanding at least a first pair of spacer fingers by engaging the spacer between the female coupler and the male coupler and contracting the first pair of spacer fingers to engage the male coupler in a spacer receiver.

24. The method of claim 23, including restraining travel of the snap ring by a female coupler ledge during initial insertion and thereby causing expansion of the snap to override the crest of a first ridge and enter the annular groove.

25. The method of claim 23, including resisting separating translation on the female coupler and the male coupler caused by fluid under pressure by coupling the spacer to the male coupler, presenting a spacer surface to the female coupler, and bearing the female coupler on the spacer surface.

26. The method of claim 23, including restraining travel of the snap ring by a female coupler ledge during further plunging insertion and thereby causing expansion of the snap to override the crest of a second ridge and enter a relief defined on the male coupler.

27. The method of claim 23, including expanding a second pair of spacer fingers by engaging the spacer between the female coupler and the male coupler and engaging the second pair of spacer fingers with a female coupler hexagonal margin.

* * * * *